United States Patent
Steinberg et al.

(10) Patent No.: US 8,212,897 B2
(45) Date of Patent: *Jul. 3, 2012

(54) DIGITAL IMAGE ACQUISITION SYSTEM WITH PORTRAIT MODE

(75) Inventors: Eran Steinberg, San Francisco, CA (US); Adrian Zamfir, Bucharest (RO); Adrian Capata, Bucharest (RO); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 284 days.

This patent is subject to a terminal disclaimer.

(21) Appl. No.: 12/724,391

(22) Filed: Mar. 15, 2010

(65) Prior Publication Data

US 2010/0182458 A1   Jul. 22, 2010

Related U.S. Application Data

(63) Continuation of application No. 11/319,766, filed on Dec. 27, 2005, now Pat. No. 7,692,696.

(51) Int. Cl.
*H04N 5/262* (2006.01)

(52) U.S. Cl. .................. 348/239; 348/222.1; 348/208.4

(58) Field of Classification Search ............... 348/222.1, 348/239, 208.4
See application file for complete search history.

(56) References Cited

U.S. PATENT DOCUMENTS

| | | |
|---|---|---|
| 4,683,496 A | 7/1987 | Tom |
| 5,046,118 A | 9/1991 | Ajewole et al. |
| 5,063,448 A | 11/1991 | Jaffray et al. |
| 5,086,314 A | 2/1992 | Aoki et al. |
| 5,109,425 A | 4/1992 | Lawton |
| 5,130,935 A | 7/1992 | Takiguchi |
| 5,164,993 A | 11/1992 | Capozzi et al. |

(Continued)

FOREIGN PATENT DOCUMENTS

EP   1 367 538 A2   12/2003

(Continued)

OTHER PUBLICATIONS

Adelson, E.H., "Layered Representations for Image Coding, http://web.mit.edu/persci/people/adelson/pub.sub.--pdfs/layers91.pdf.", Massachusetts Institute of Technology, 1991, 20 pages.

(Continued)

*Primary Examiner* — Jason Chan
*Assistant Examiner* — Joel Fosselman
(74) *Attorney, Agent, or Firm* — Andrew V. Smith

(57) ABSTRACT

A digital image acquisition system having no photographic film comprises an apparatus for capturing digital images and a flash unit for providing illumination during image capture. The system has a portrait mode for generating an image of a foreground object against a blurred background, the portrait mode being operable to capture first, second and third images (A, B and C) of nominally the same scene. One of the first and second images (A, B) is taken with flash and the other is taken without flash, and the third image (C) is blurred compared to the first and second images. The portrait mode is further operable to determine foreground and background regions of the scene using the first and second images (A, B), and to substitute the blurred background of the third image (C) for the background of an in-focus image of the scene. In one embodiment the in-focus image is one of the first and second images. In another embodiment the in-focus image is a fourth image.

46 Claims, 3 Drawing Sheets

U.S. PATENT DOCUMENTS

| | | | |
|---|---|---|---|
| 5,329,379 | A | 7/1994 | Rodriguez et al. |
| 5,500,685 | A | 3/1996 | Kokaram |
| 5,504,846 | A | 4/1996 | Fisher |
| 5,534,924 | A | 7/1996 | Florant |
| 5,594,816 | A | 1/1997 | Kaplan et al. |
| 5,621,868 | A | 4/1997 | Mizutani et al. |
| 5,724,456 | A | 3/1998 | Boyack et al. |
| 5,812,787 | A | 9/1998 | Astle |
| 5,844,627 | A | 12/1998 | May et al. |
| 5,878,152 | A | 3/1999 | Sussman |
| 5,880,737 | A | 3/1999 | Griffin et al. |
| 5,949,914 | A | 9/1999 | Yuen |
| 5,990,904 | A | 11/1999 | Griffin |
| 6,005,959 | A | 12/1999 | Mohan et al. |
| 6,008,820 | A | 12/1999 | Chauvin et al. |
| 6,018,590 | A | 1/2000 | Gaborski |
| 6,061,476 | A | 5/2000 | Nichani |
| 6,069,635 | A | 5/2000 | Suzuoki et al. |
| 6,069,982 | A | 5/2000 | Reuman |
| 6,122,408 | A | 9/2000 | Fang et al. |
| 6,184,926 | B1 | 2/2001 | Khosravi et al. |
| 6,198,505 | B1 | 3/2001 | Turner et al. |
| 6,240,217 | B1 | 5/2001 | Ercan et al. |
| 6,243,070 | B1 | 6/2001 | Hill et al. |
| 6,292,194 | B1 | 9/2001 | Powell, III |
| 6,326,964 | B1 | 12/2001 | Snyder et al. |
| 6,407,777 | B1 | 6/2002 | DeLuca |
| 6,483,521 | B1 | 11/2002 | Takahashi et al. |
| 6,526,161 | B1 | 2/2003 | Yan |
| 6,535,632 | B1 | 3/2003 | Park et al. |
| 6,538,656 | B1 | 3/2003 | Cheung et al. |
| 6,577,762 | B1 | 6/2003 | Seeger et al. |
| 6,577,821 | B2 | 6/2003 | Malloy |
| 6,593,925 | B1 | 7/2003 | Hakura et al. |
| 6,631,206 | B1 | 10/2003 | Cheng et al. |
| 6,670,963 | B2 | 12/2003 | Osberger |
| 6,678,413 | B1 | 1/2004 | Liang et al. |
| 6,683,992 | B2 | 1/2004 | Takahashi et al. |
| 6,744,471 | B1 | 6/2004 | Kakinuma et al. |
| 6,756,993 | B2 | 6/2004 | Popescu et al. |
| 6,781,598 | B1 | 8/2004 | Yamamoto et al. |
| 6,803,954 | B1 | 10/2004 | Hong et al. |
| 6,804,408 | B1 | 10/2004 | Gallagher et al. |
| 6,836,273 | B1 | 12/2004 | Kadono |
| 6,842,196 | B1 | 1/2005 | Swift et al. |
| 6,850,236 | B2 | 2/2005 | Deering |
| 6,930,718 | B2 | 8/2005 | Parulski et al. |
| 6,952,225 | B1 | 10/2005 | Hyodo et al. |
| 6,956,573 | B1 | 10/2005 | Bergen et al. |
| 6,987,535 | B1 | 1/2006 | Matsugu et al. |
| 6,989,859 | B2 | 1/2006 | Parulski |
| 6,990,252 | B2 | 1/2006 | Shekter |
| 7,013,025 | B2 | 3/2006 | Hiramatsu |
| 7,035,477 | B2 | 4/2006 | Cheatle |
| 7,042,505 | B1 | 5/2006 | DeLuca |
| 7,054,478 | B2 | 5/2006 | Harman |
| 7,064,810 | B2 | 6/2006 | Anderson et al. |
| 7,081,892 | B2 | 7/2006 | Alkouh |
| 7,102,638 | B2 | 9/2006 | Raskar et al. |
| 7,103,227 | B2 | 9/2006 | Raskar et al. |
| 7,103,357 | B2 | 9/2006 | Kirani et al. |
| 7,149,974 | B2 | 12/2006 | Girgensohn et al. |
| 7,176,975 | B2* | 2/2007 | Matsunaga et al. ........... 348/345 |
| 7,206,449 | B2 | 4/2007 | Raskar et al. |
| 7,218,792 | B2 | 5/2007 | Raskar et al. |
| 7,295,720 | B2 | 11/2007 | Raskar |
| 7,317,843 | B2 | 1/2008 | Sun et al. |
| 7,340,110 | B2 | 3/2008 | Lim et al. |
| 7,352,394 | B1 | 4/2008 | DeLuca et al. |
| 7,359,562 | B2 | 4/2008 | Raskar et al. |
| 7,394,489 | B2 | 7/2008 | Yagi |
| 7,469,071 | B2 | 12/2008 | Drimbarean et al. |
| 7,738,015 | B2 | 6/2010 | Steinberg et al. |
| 2001/0000710 | A1 | 5/2001 | Queiroz et al. |
| 2001/0012063 | A1 | 8/2001 | Maeda |
| 2002/0028014 | A1 | 3/2002 | Ono |
| 2002/0080261 | A1* | 6/2002 | Kitamura et al. ............ 348/349 |
| 2002/0093670 | A1 | 7/2002 | Luo et al. |
| 2002/0180748 | A1 | 12/2002 | Popescu et al. |
| 2002/0191860 | A1 | 12/2002 | Cheatle |
| 2003/0038798 | A1 | 2/2003 | Besl et al. |
| 2003/0052991 | A1 | 3/2003 | Stavely et al. |
| 2003/0091225 | A1 | 5/2003 | Chen |
| 2003/0103159 | A1 | 6/2003 | Nonaka |
| 2003/0169944 | A1 | 9/2003 | Dowski et al. |
| 2003/0184671 | A1 | 10/2003 | Robins et al. |
| 2004/0047513 | A1 | 3/2004 | Kondo et al. |
| 2004/0145659 | A1 | 7/2004 | Someya et al. |
| 2004/0201753 | A1 | 10/2004 | Kondo et al. |
| 2004/0208385 | A1 | 10/2004 | Jiang |
| 2004/0223063 | A1 | 11/2004 | DeLuca et al. |
| 2005/0017968 | A1 | 1/2005 | Wurmlin et al. |
| 2005/0031224 | A1 | 2/2005 | Prilutsky et al. |
| 2005/0041121 | A1 | 2/2005 | Steinberg et al. |
| 2005/0058322 | A1 | 3/2005 | Farmer et al. |
| 2005/0140801 | A1 | 6/2005 | Prilutsky et al. |
| 2005/0195317 | A1 | 9/2005 | Myoga |
| 2005/0213849 | A1 | 9/2005 | Kreang-Arekul et al. |
| 2005/0243176 | A1 | 11/2005 | Wu et al. |
| 2005/0271289 | A1 | 12/2005 | Rastogi |
| 2006/0008171 | A1 | 1/2006 | Petschnigg et al. |
| 2006/0039690 | A1 | 2/2006 | Steinberg et al. |
| 2006/0104508 | A1 | 5/2006 | Daly et al. |
| 2006/0153471 | A1 | 7/2006 | Lim et al. |
| 2006/0181549 | A1 | 8/2006 | Alkouh |
| 2006/0193509 | A1 | 8/2006 | Criminisi et al. |
| 2007/0195174 | A1 | 8/2007 | Oren |
| 2007/0237355 | A1 | 10/2007 | Song et al. |
| 2008/0316328 | A1 | 12/2008 | Steinberg et al. |
| 2012/0069198 | A1 | 3/2012 | Steinberg et al. |
| 2012/0069222 | A1 | 3/2012 | Steinberg et al. |

FOREIGN PATENT DOCUMENTS

| | | | |
|---|---|---|---|
| JP | 2281879 | A2 | 11/1990 |
| JP | 4127675 | A2 | 4/1992 |
| JP | 6014193 | A2 | 1/1994 |
| JP | 8223569 | A2 | 8/1996 |
| JP | 10285611 | A2 | 10/1998 |
| JP | 2000-102040 | A2 | 4/2000 |
| JP | 2000-299789 | A2 | 10/2000 |
| JP | 2001-101426 | A2 | 4/2001 |
| JP | 2001-223903 | A2 | 8/2001 |
| JP | 2002-112095 | A2 | 4/2002 |
| JP | 2003-281526 | A2 | 10/2003 |
| JP | 2004-064454 | A2 | 2/2004 |
| JP | 2004-166221 | A2 | 6/2004 |
| JP | 2004-185183 | A2 | 7/2004 |
| JP | 2006-024206 | A2 | 1/2006 |
| JP | 2006-080632 | A2 | 3/2006 |
| JP | 2006-140594 | A2 | 6/2006 |
| WO | 94/26057 | A1 | 11/1994 |
| WO | WO 94/26057 | A1 | 11/1994 |
| WO | WO 02/052839 | A2 | 7/2002 |
| WO | WO 02/089046 | A1 | 11/2002 |
| WO | WO 2004/017493 | A1 | 2/2004 |
| WO | WO 2004/036378 | A2 | 4/2004 |
| WO | WO 2004/059574 | A2 | 7/2004 |
| WO | WO 2005/015896 | A1 | 2/2005 |
| WO | WO 2005/076217 | A2 | 8/2005 |
| WO | WO 2005/099423 | A2 | 10/2005 |
| WO | WO 2005/101309 | A1 | 10/2005 |
| WO | WO 2007/025578 | A1 | 3/2007 |
| WO | 2007/073781 | A1 | 7/2007 |
| WO | WO 2007/073781 | A1 | 7/2007 |
| WO | WO 2007/093199 | A2 | 8/2007 |
| WO | WO 2007/095477 | A2 | 8/2007 |

OTHER PUBLICATIONS

Aizawa, K. et al., "Producing object-based special effects by fusing multiple differently focused images, http://rlinks2.dialog.com/NASApp/ChannelWEB/DialogProServlet?ChName=engineering", IEEE transactions on circuits and systems for video technology, 2000, pp. 323-330, vol. 10—Issue 2.

Ashikhmin, Michael, "A tone mapping algorithm for high contrast images, http://portal.acm.org/citation.cfm?id=581 91 6&,coll=Portal&dl=ACM&CFID=1 7220933&CFTOKE N=89149269", ACM International Conference Proceeding Series, Proceedings of the 13th Eurographics workshop on Rendering, 2002, pp. 145-156, vol. 28.

Barreiro, R.B. et al., "Effect of component separation on the temperature distribution of the cosmic microwave background, Monthly Notices of the Royal Astronomical Society, Current Contents Search®. Dialog® File No. 440 Accession No. 23119677", 2006, pp. 226-246, vol. 368—Issue 1.

Beir, Thaddeus, "Feature-Based Image Metamorphosis," in Siggraph '92, Silicon Graphics Computer Systems, 2011 Shoreline Blvd, Mountain View CA 94043, http://www.hammerhead.com/thad/thad.html.

Benedek, C. et al., "Markovian framework for foreground-background-shadow separation of real world video scenes, Proceedings v 3851 LNCS 2006, Ei Compendex®. Dialog® File No. 278 Accession No. 11071345", 7th Asian Conference on Computer Vision, 2006.

Boutell, M. et al., "Photo classification by integrating image content and camera metadata", Pattern Recognition, Proceedings of the 17th International Conference, 2004, pp. 901-904, vol. 4.

Braun M. et al., "Information Fusion of Flash and Non-Flash Images, retrieved from the Internet: URL: http://graphics.stanford.edu/{georgp/vision.htm", 2002, pp. 1-12.

C. Swain and T. Chen, Defocus-based image segmentation, in Proceedings ICASSP-95, vol. 4, pp. 2403-2406, Detroit, MI, May 1995. IEEE. http://citeseer.ist.psu.edu/swain95defocusbased.html.

Chen, Shenchang et al., "View interpolation for image synthesis, ISBN:0-89791-601-8, http://portal.acm.org/citation.cfm?id=166153&coli=GUIDE&dl=GUIDE&CFID=680-9268&CFTOKEN=82843223.", International Conference on Computer Graphics and Interactive Techniques, Proceedings of the 20th annual conference on Computer graphics and interactive techniques, 1993, pp. 279-288, ACM Press.

Eissemann, E. et al., "Flash Photography Enhancement via Intrinsic Relighting", ACM Transactions on Graphics, 2004, pp. 673-678, vol. 23—Issue 3.

Eissemann, E. et al., "Flash Photography Enhancement via Intrinsic Relighting, ACM Transactions on URL: http://graphics.stanford.edu/{georgp/vision.htm", 2002, pp. 1-12.

Eriksen, H.K. et al., "Cosmic microwave background component separation by parameter estimation, INSPEC. Dialog® File No. 2 Accession No. 9947674", Astrophysical Journal, 2006, pp. 665-682, vol. 641—Issue 2.

European Patent Office, Communication pursuant to Article 94(3) EPC for EP Application No. 06776529.7, dated Jan. 30, 2008, 3 pages.

European Patent Office, extended European Search Report for EP application No. 07024773.9, dated Jun. 3, 2008, 5 pages.

European Patent Office, extended European Search Report for EP application No. 07756848.3, dated May 27, 2009, 4 pages.

Favaro, Paolo, "Depth from focus/defocus, http://homepages.inf.ed.ac.uk/rbf/Cvonline/LOCAL_COPIES/FAVARO1/dfdtutorial.html.", 2002.

Final Office Action mailed Feb. 4, 2009, for U.S. Appl. No. 11/319,766, filed Dec. 27, 2005.

Final Office Action mailed Jun. 24, 2009, for U.S. Appl. No. 11/744,020, filed May 3, 2007.

Final Office Action mailed Sep. 15, 2010, for U.S. Appl. No. 11/744,020, filed May 3, 2007.

Final Office Action mailed Sep. 18, 2009, for U.S. Appl. No. 11/319,766, filed Dec. 27, 2005.

Haneda, E., "Color Imaging XII: Processing, Hardcopy, and Applications", Proceedings of Society of Optical Engineers, 2007, vol. 6493.

Hashi Yuzuru et al., "A New Method to Make Special Video Effects. Trace and Emphasis of Main Portion of Images, Japan Broadcasting Corp., Sci. and Techical Res. Lab., JPN, Eizo Joho Media Gakkai Gijutsu Hokoku, http://rlinks2.dialog.com/NASApp/ChannelWEB/DialogProServlet?ChName=engineering", 2003, pp. 23-26, vol. 27.

Heckbert, Paul S., "Survey of Texture Mapping, http://citeseer.ist.psu.edu/135643.html", Proceedings of Graphics Interface '86. IEEE Computer Graphics and Applications, 1986, pp. 56-67 & 207-212.

Homayoun Kamkar-Parsi, A., "A multi-criteria model for robust foreground extraction, http://portal.acm.org/citation.cfm?id=1099410&coll=Porial&dl=ACM&CFID=17220933&CFTOKEN=89149269", Proceedings of the third ACM international workshop on Video surveillance & sensor networks, 2005, pp. 67-70, ACM Press.

Jin, Hailin et al., "A Variational Approach to Shape from Defocus, {ECCV} (2), http://citeseerist.psu.edu/554899.html", 2002, pp. 18-30.

Jin, J., "Medical Imaging, Image Processing, Murray H. Loew, Kenneth M. Hanson, Editors", Proceedings of SPIE, 1996, pp. 864-868, vol. 2710.

Kelby, Scott, "Photoshop Elements 3: Down & Dirty Tricks, ISBN: 0-321-27835-6, One Hour Photo: Portrait and studio effects", 2004, Chapter 1, Peachpit Press.

Kelby, Scott, "The Photoshop Elements 4 Book for Digital Photographers, XP002406720, ISBN: 0-321-38483-0, Section: Tagging Images of People (Face Tagging)", 2005, New Riders.

Khan, E.A., "Image-based material editing, http://portal.acm.org/citation.cfm?id=1141937&coll=GUIDE&dl=GUIDE&CFID=68-09268&CFTOKEN=82843223", International Conference on Computer Graphics and Interactive Techniques, 2006, pp. 654 663, ACM Press.

Komatsu, Kunitoshi et al., "Design of Lossless Block Transforms and Filter Banks for Image Coding, http://citeseerist.psu.edu/komatsu99design.html".

Leray et al., "Spatially distributed two-photon excitation fluorescence in scattering media: Experiments and timeresolved Monte Carlo simulations", Optics Communications, 2007, pp. 269-278, vol. 272—Issue 1.

Leubner, Christian, "Multilevel Image Segmentation in Computer-Vision Systems, http://citeseerist.psu.edu/565983.html".

Li, Han et al., "A new model of motion blurred images and estimation of its parameter", Acoustics, Speech, and Signal Processing, IEEE International Conference on ICASSP '86, 1986, pp. 2447-2450, vol. 11.

Li, Liyuan et al., "Foreground object detection from videos containing complex background, http//portaLacm.org/citation.cfm?id=957017&coll=Portal&dl=ACM&CFI D=17220933 &CFTCKEN=89149269", Proceedings of the eleventh ACM international conference on Multimedia, 2003, pp. 2-10, ACM Press.

Li, S. et al., "Multifocus image fusion using artificial neural networks, DOI= http://dx.doi.org/10.1016/S0167-8655(02)00029-6", Pattern Recogn. Lett, 2002, pp. 985-997, vol. 23.

McGuire, M. et al., "Defocus video matting, DOI= http://doi.acm.org/10.1145/1073204.1073231", ACM Trans. Graph., 2005, pp. 567-576, vol. 24—Issue 3.

Neri, A. et al., "Automatic moving object and background separation Ei Compendex®. Dialog® File No. 278 Accession No. 8063256", Signal Processing, 1998, pp. 219-232, vol. 66—Issue 2.

Non-Final Office Action mailed Aug. 6, 2008, for U.S. Appl. No. 11/319,766, filed Dec. 27, 2005.

Non-Final Office Action mailed Jul. 13, 2009, for U.S. Appl. No. 11/421,027, filed May 30, 2006.

Non-Final Office Action mailed Mar. 10, 2009, for U.S. Appl. No. 11/217,788, filed Aug. 30, 2005.

Non-Final Office Action mailed Mar. 31, 2010, for U.S. Appl. No. 11/744,020, filed May 3, 2007.

Non-Final Office Action mailed Nov. 25, 2008, for U.S. Appl. No. 11/217,788, filed Aug. 30, 2005.

Non-Final Office Action mailed Sep. 11, 2008, for U.S. Appl. No. 11/744,020, filed May 3, 2007.

Office Action in co-pending European Application No. 06 776 529.7-2202, entitled "Communication Pursuant to Article 94(3) EPC", dated Sep. 30, 2008, 3 pages.

Owens, James, "Method for depth of field (DOE) adjustment using a combination of object segmentation and pixel binning", Research Disclosure, 2004, vol. 478, No. 97, Mason Publications.

Pavlidis et al., "A Multi-Segment Residual Image Compression Technique" http://citeseerist.psu.edu/554555.html.

PCT International Preliminary Report on Patentability, for PCT Application No. PCT/EP2006/007573, dated Jul. 1, 2008, 9 pages.

PCT International Preliminary Report on Patentability, for PCT Application No. PCT/EP2006/008229, dated Aug. 19, 2008, 15 pages.

PCT International Preliminary Report on Patentability, for PCT Application No. PCT/US2007/061956, dated Oct. 27, 2008, 3 pages.
PCT International Preliminary Report on Patentability, for PCT Application No. PCT/US2007/068190, dated Nov. 4, 2008, 8 pages.
PCT International Search Report and the Written Opinion of the International Searching Authority, or the Declaration for PCT application No. PCT/US2007/068190, dated Sep. 29, 2008, 10 pages.
PCT Notification of Transmittal of the International Search Report and the Written Opinion of the International Searching Authority, or the Declaration, for PCT Application No. PCT/EP2006/005109, Oct. 4, 2006, 14 pages.
PCT Notification of Transmittal of the International Search Report and the Written Opinion of the International Searching Authority, or the Declaration for PCT application No. PCT/EP2006/008229, dated Jan. 14, 2008, 18 pages.
PCT Notification of Transmittal of the International Search Report and the Written Opinion of the International Searching Authority, or the Declaration for PCT application No. PCT/US2007/061956, dated Mar. 14, 2008, 9 pages.
PCT Notification of Transmittal of the International Search Report and the Written Opinion of the International Searching Authority, or the Declaration (PCT/EP2006/007573), dated Nov. 27, 2006.
Petschnigg, G. et al., "Digital Photography with Flash and No Flash Image Pairs", The Institution of Electrical Engineers, 2004, pp. 664-672.
Potmesil, Michael et al., "A lens and aperture camera model for synthetic image generation, ISBN:0-89791-045-1, http://portal.acm.org/citation.cfm?id=806818&coli=GUIDE&dl=GUIDE &CFID=680-9268&CFTOKEN=82843222.", International Conference on Computer Graphics and Interactive Techniques, Proceedings of the 8th annual conference on Computer graphics and interactive techniques, 1981, pp. 297-305, ACM Press.
Rajagopalan, A.N. et al., "Optimal recovery of depth from defocused images using an mrf model, http://citeseer.ist.psu.edu/rajagopalan98optimal.html", In Proc. International Conference on Computer Vision, 1998, pp. 1047-1052.
Reinhard, E. et al., "Depth-of-field-based alpha-matte extraction, http://doi.acm.org/10.1145/1080402.1080419", In Proceedings of the 2nd Symposium on Applied Perception in Graphics and Visualization, 2005, pp. 95-102, vol. 95.
Sa, A. et al., "Range-Enhanced Active Foreground Extraction, XP010851333", Image Processing, IEEE International Conference, 2005, pp. 81-84.
Saito, T. et al., "Separation of irradiance and reflectance from observed color images by logarithmical nonlinear diffusion process, Ei Compendex®. Dialog® File No. 278 Accession No. 10968692", Proceedings of Society for Optical Engineering Computational Imaging IV—Electronic Imaging, 2006, vol. 6065.
Schechner, Y.Y. et al., "Separation of transparent layers using focus, http:l/citeseer.ist.psu.edu/article/schechner98separation.html", Proc. ICCV, 1998, pp. 1061-1066.
Serrano, N. et al., "A computationally efficient approach to indoor/outdoor scene classification, XP010613491, ISBN: 978-0-7695-1695-0.", Pattern Recognition, 2002 Proceedings. 16th International Conference, IEEE Comput. Soc, 2002, pp. 146-149, vol. 4.
Simard, Patrice Y. et al., "A foreground/background separation algorithm for image compression, Ei Compendex®. Dialog® File No. 278 Accession No. 9897343", Data Compression Conference Proceedings, 2004.
Subbarao, M. et al., "Depth from Defocus: A Spatial Domain Approach, Technical Report No. 9212.03, http://citeseerist.psu.edu/subbarao94depth.html", Computer Vision Laboratory, SUNY.
Subbarao, Murali et al., "Noise Sensitivity Analysis of Depth-from-Defocus by a Spatial-Domain Approach, http://citeseer.ist.psu.edu/subbarao97noise.html".
Sun, J. et al., "Flash Matting", ACM Transactions on Graphics, 2006, pp. 772-778, vol. 25—Issue 3.
Szummer, M. et al., "Indoor-outdoor image classification", Content-Based Access of Image and Video Database, Proceedings., IEEE International Workshop, IEEE Comput. Soc, 1998, pp. 42-51.
Television Asia, "Virtual sets and chromakey update: superimposing a foreground captured by one camera onto a background from another dates back to film days, but has come a long way since," Television Asia, vol. 13, No. 9, p. 26, Nov. 2006. Business & Industry®. Dialog® File No. 9 Accession No. 4123327.
Tzovaras, D. et al., "Three-dimensional camera motion estimation and foreground/background separation for stereoscopic image sequences, INSPEC. Dialog® File No. 2 Accession No. 6556637.", Optical Engineering, 1997, pp. 574-579, vol. 36—Issue 2.
Utpal, G. et al., "On foreground-background separation in low quality document images, INSPEC. Dialog® File No. 2 Accession No. 9927003", International Journal on Document Analysis and Recognition, 2006, pp. 47-63, vol. 8—Issue 1.
Watanabe, Masahiro et al., "Rational Filters for Passive Depth from Defocus", 1995.
Yu, Jingyi et al., "Real-time reflection mapping with parallax, http//portal.acm.org/citation.cfm?id=1053449&coll=Portal&dl=ACM &CFID=1 7220933&CFTOKEN=89149269", Symposium on Interactive 3D Graphics, Proceedings of the 2005 symposium on Interactive 3D graphics and games, 2005, pp. 133-138, ACM Press.
Ziou, D. et al., "Depth from Defocus Estimation in Spatial Domain, http://citeseer.ist.psu.edu/ziou99depth.html", CVIU, 2001, pp. 143-165, vol. 81—Issue 2.
Patent Abstracts of Japan, publication No. JP2005-004799A, published on Jan. 6, 2005, Object Extraction Apparatus, 1 Page.
Patent Abstracts of Japan, publication No. JP2005-229198A, published Aug. 25, 2005, Image Processing Apparatus and Method, and Program, 1 Page.
Patent Abstracts of Japan, publication No. JP2003-058894A, published Feb. 28, 2003, Method and Device for Segmenting Pixeled Image, 1 Page.
Patent Abstracts of Japan, publication No. JP2001-229390A, published Aug. 24, 2001, Method and Device for Changing Pixel Image into Segment, 1 Page.
Patent Abstracts of Japan, publication No. JP2002-373337A, published Dec. 26, 2002, Device and Method for Processing Image, Recording Medium and Program, 1 Page.
Patent Abstracts of Japan, publication No. JP2004-236235A, published Aug. 19, 2004, Image Device, 1 Page.
Non-final Rejection, dated Aug. 4, 2011, for U.S. Appl. No. 12/140,827, filed Jun. 17, 2008.
Final Rejection, dated Mar. 28, 2012, for U.S. Appl. No. 12/140,827, filed Jun. 17, 2008.
Braun M et al.: "Information Fusion of Flash and Non-Flash Images" Internet Citation, [Online] Dec. 31, 2002, XP002398967 Retrieved from the Internet: URL:http://graphics.stanford.edu/~georgp/vision.htm> [retrieved on Sep. 14, 2006].
Scott Kelby: "Photoshop Elements 3: Down & Dirty Tricks" Dec. 27, 2004, PeachPit Press, XP002406719 ISBN: 0-321-27835-6 Chapter 1. One Hour Photo: Portrait and studio effects.
Morgan McGuire and Wojciech Matusik and Hanspeter Pfister and John F. Hughes and Frédo Durand: "Defocus video matting" SIGGRAPH 2005, [Online] Jul. 31, 2005, XP002406140 Retrieved from the Internet: URL:http://www.cs.brown.edu/people/morgan/DefocusVideoMatting/mcg05-DefocusVideoMatting.pdf> [retrieved on Nov. 7, 2006].
Scott Kelby: "The Photoshop Elements 4 Book for Digital Photographers" Nov. 14, 2005, New Riders, XP002406720 ISBN: 0-321-38483-0 Section: Tagging Images of People (Face Tagging).

* cited by examiner

DIGITAL IMAGE ACQUISITION SYSTEM WITH PORTRAIT MODE

PRIORITY AND CROSS-REFERENCE TO RELATED APPLICATIONS

This application is a Continuation of U. S. patent application Ser. No. 11/319,766, filed Dec. 27, 2005, now U.S. Pat. No. 7,692,696, and this application is related to U.S. pat. application Ser. No. 12/140,827, filed Jun. 17, 2008, and PCT application no. PCT/EP2006/007573, filed Jul. 31, 2006, each of which are all hereby incorporated by reference.

BACKGROUND OF THE INVENTION

1. Field of the Invention

This invention relates to a digital image acquisition system having a portrait mode for generating an image of a foreground object against a blurred background, and a corresponding method.

2. Description of the Related Art

In digital cameras the depth of field (DOF) is typically much greater than for conventional cameras due to the image sensor being somewhat smaller than a 35 mm film negative. This means that portrait images, in particular, will tend to have the background in sharp focus, which may not be desirable as the photographer may wish to emphasize the person's face and de-emphasize the background of the picture. This problem can be corrected by careful photography combined with careful use of camera settings. Alternatively, portrait images are often blurred manually by professional photographers using image processing algorithms. A blurring algorithm may apply various techniques using convolution kernels to create the blurring effects. These effects are normally added on a desktop computer after an image has been captured. This may involve manual intervention and be time-consuming.

US 2003/0052991 discloses to adjust image brightness based on depths of different image features. A digital camera simulates the use of fill flash. The camera takes a series of photographs of a scene at various focus distances. The photographs are stored, along with their corresponding focus distances. The photographs are analyzed to determine distances to objects at various locations of the scene. Regions of a final photograph are selectively adjusted in brightness based on distance information to simulate the effect that would have resulted had fill flash been used.

SUMMARY OF THE INVENTION

There is provided a digital image acquisition system having no photographic film. The system includes an apparatus for capturing digital images and a flash unit for providing illumination during image capture. The system has a portrait mode for generating an image of a foreground object against a blurred background. The portrait mode is operable to capture first, second and third images of nominally the same scene, not necessarily in the order stated. One of the first and second images is taken with flash and the other is taken without flash. The third image is blurred compared to the first and second images. The portrait mode is operable to determine foreground and background regions of the scene using the first and second images, and to substitute the blurred background of the third image for the background of a substantially in-focus image of the scene.

There is further provided a method of generating a digital image of a foreground object against a blurred background. The method includes capturing first, second and third images of nominally the same scene, not necessarily in the order stated. One of the first and second images is taken with flash and the other is taken without flash. The third image is blurred compared to the first and second images. Foreground and background regions of the scene are determined using the first and second images. The blurred background of the third image is substituted for the background of a substantially in-focus image of the scene.

In one embodiment, the substantially in-focus image is one of the first and second images.

In a second embodiment, the substantially in-focus image is a fourth image.

BRIEF DESCRIPTION OF THE DRAWINGS

Embodiments will now be described, by way of example, with reference to the accompanying drawings, in which.

DETAILED DESCRIPTION OF PREFERRED EMBODIMENTS

Figure 1:
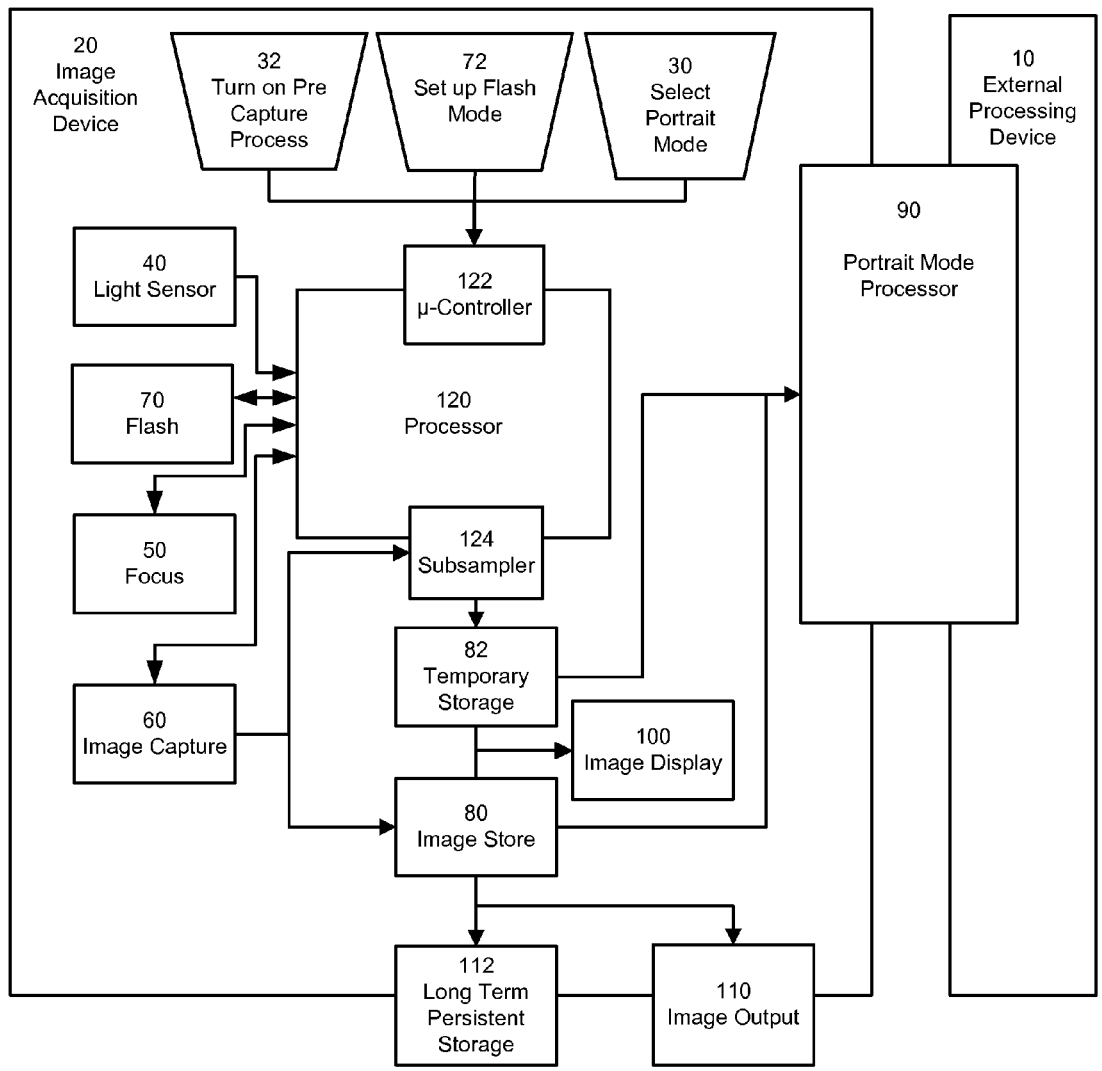
FIG. 1 is a block diagram of a camera apparatus operating in accordance with one embodiment.

FIG. 1 shows a block diagram of an image acquisition device 20 operating in accordance with a preferred embodiment. The digital acquisition device 20, which in the present embodiment is a portable digital camera, includes a processor 120. It can be appreciated that many of the processes implemented in the digital camera may be implemented in or controlled by software operating in a microprocessor, central processing unit, controller, digital signal processor and/or an application specific integrated circuit, collectively depicted as block 120 labelled "processor". Generically, all user interface and control of peripheral components such as buttons and display is controlled by a microcontroller 122. The processor 120, in response to a user input at 122, such as half pressing a shutter button (pre-capture mode 32), initiates and controls the digital photographic process. Ambient light exposure is monitored using light sensor 40 in order to automatically determine if a flash is to be used. A distance to the subject is determined using a focus component 50 which also focuses the image on image capture component 60. If a flash is to be used, processor 120 causes the flash 70 to generate a photographic illumination in substantial coincidence with the recording of the image by image capture component 60 upon full depression of the shutter button. The image capture component 60 digitally records the image in color. The image capture component 60 preferably includes a CCD (charge coupled device) or CMOS to facilitate digital recording. The flash 70 may be selectively generated either in response to the light sensor 40 or a manual input 72 from the user of the camera. The high resolution image recorded by image capture component 60 is stored in an image store 80 which may comprise computer memory such a dynamic random access memory or a non-volatile memory. The camera is equipped with a display 100, such as an LCD, for preview and postview of images.

In the case of preview images which are generated in the pre-capture mode 32 with the shutter button half-pressed, the display 100 can assist the user in composing the image, as well as being used to determine focusing and exposure. Temporary storage 82 is used to store one or more of the preview images and can be part of the image store 80 or a separate component. The preview image is preferably generated by the image capture component 60. For speed and memory efficiency reasons, preview images preferably have a lower pixel resolution than the main image taken when the shutter button is fully depressed, and are generated by subsampling a raw captured image using software 124 which can be part of the general processor 120 or dedicated hardware or combination thereof. Depending on the settings of this hardware subsystem, the pre-acquisition image processing may satisfy some predetermined test criteria prior to storing a preview image. Such test criteria may be chronological, such as to constantly replace the previous saved preview image with a new captured preview image every 0.5 seconds during the pre-capture mode 32, until the final high resolution image is captured by full depression of the shutter button. More sophisticated criteria may involve analysis of the preview image content, for example, testing the image for changes, before deciding whether the new preview image should replace a previously saved image. Other criteria may be based on image analysis such as sharpness, or metadata analysis such as an exposure condition, whether a flash is going to happen, and/or a distance to the subject.

If test criteria are not met, the camera continues by capturing the next preview image without saving the current one. The process continues until the final high resolution image is acquired and saved by fully depressing the shutter button.

Where multiple preview images can be saved, a new preview image will be placed on a chronological First In First Out (FIFO) stack, until the user takes the final picture. The reason for storing multiple preview images is that the last preview image, or any single preview image, may not be the best reference image for comparison with the final high resolution image in, for example, a red-eye correction process or, in a preferred embodiment, portrait mode processing. By storing multiple images, a better reference image can be achieved, and a closer alignment between the preview and the final captured image can be achieved in an alignment stage discussed later.

The camera is also able to capture and store in the temporary storage 82 one or more low resolution post-view images when the camera is in portrait mode, as will be described. Post-view images are preferably the same as preview images, except that they occur after the main high resolution image is captured.

The camera 20 preferably has a user-selectable portrait mode 30. Alternatively, camera software may include face detection functionality arranged to detect one or more faces in one or more of a series of preview images being captured and if so to switch to portrait mode. In portrait mode, when the shutter button is depressed the camera is caused to automatically capture and store a series of images at close intervals so that the images are nominally of the same scene. The particular number, resolution and sequence of images, whether flash is used or not, and whether the images are in or out of focus, depends upon the particular embodiment, as will be described. A portrait mode processor 90 analyzes and processes the stored images according to a workflow to be described. The processor 90 can be integral to the camera 20—indeed, it could be the processor 120 with suitable programming—or part of an external processing device 10 such as a desktop computer. In this embodiment the processor 90 receives a main high resolution image from the image store 80 as well as one or more pre- or post-view images from temporary storage 82.

Where the portrait mode processor 90 is integral to the camera 20, the final processed image may be displayed on image display 100, saved on a persistent storage 112 which can be internal or a removable storage such as CF card, SD card or the like, or downloaded to another device, such as a personal computer, server or printer via image output component 110 which can be tethered or wireless. In embodiments where the processor 90 is implemented in an external device 10, such as a desktop computer, the final processed image may be returned to the camera 20 for storage and display, or stored and displayed externally of the camera.

Figure 2:
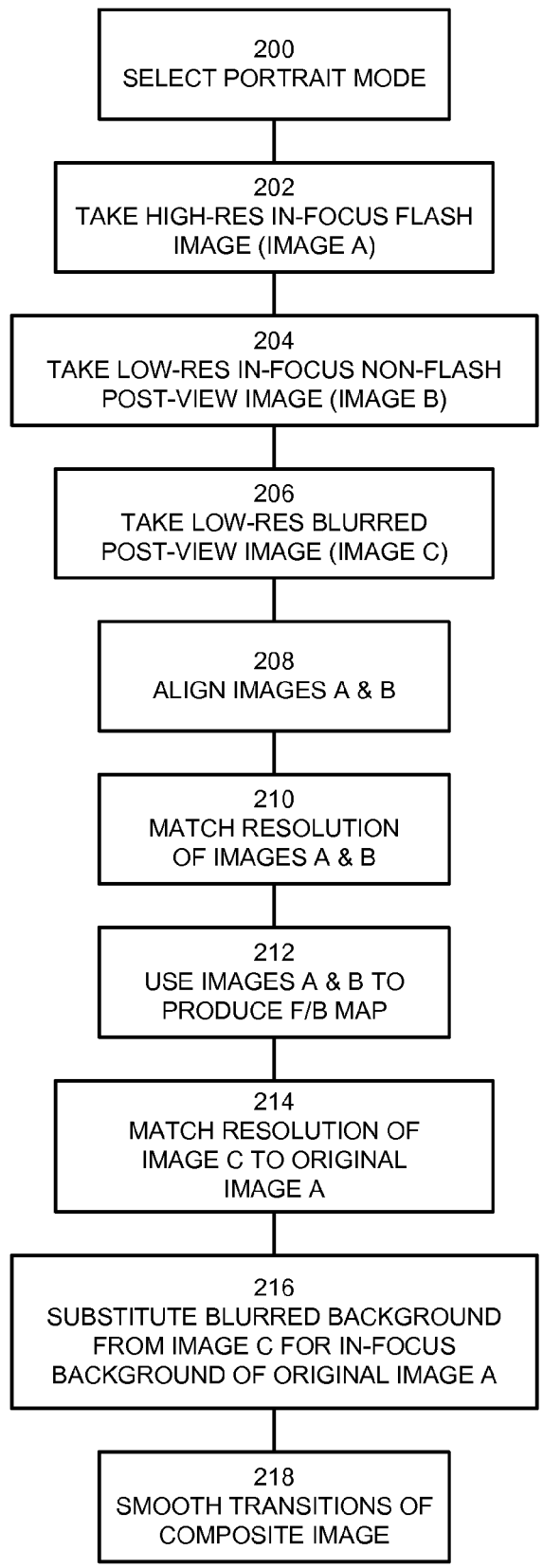
FIG. 2 shows a workflow of a portrait mode processing according to another embodiment.

FIG. 2 illustrates the workflow of a first embodiment of portrait mode processing.

First, portrait mode is selected at 200. Now, when the shutter button is fully depressed, the camera automatically captures and stores three digital images. The first image includes a high pixel resolution, in-focus, flash image of the subject of interest (image A) at 202. This is the main image whose background is to be substituted by a blurred background. The second image includes a low pixel resolution, in-focus, non-flash post-view image (image B), at 204. The third image includes a low pixel resolution, de-focussed (i.e. deliberately blurred) post-view image (image C) at 206.

These three images are taken in rapid succession so that the scene captured by each image is nominally the same. If desired, image A could be taken non-flash and image B taken with flash. In general, one of them is taken with flash and one without. Normally, in portraiture, the main image A would be the flash image but this will depend on other lighting. Image C can be flash or non-flash, but is preferably flash to provide a good contrast between foreground and background. It is to be understood that when we refer to an image being in-focus or blurred we are speaking in relative terms, since no image is perfectly in focus and especially not all over. Thus, by saying that images A and B are in focus we mean that these images, and especially in the case of image A and its background, are substantially more in focus than image C.

At 200 to 206 of FIG. 2 the just-described preferably take place in the camera 20. The remaining steps now to be described can take place in the camera 20 or in an external device 10.

Images A and B are aligned at 208, to compensate for any slight movement in the subject or camera between taking these images. Alignment may be performed globally across entire images or locally using various techniques such as those described in U.S. patent application Ser. No. 11/217,788, filed Aug. 30, 2005, which is assigned to the same assignee as the present application and is hereby incorporated by reference. Then, at 210, the images A and B are matched in pixel resolution by up-sampling image B and/or down-sampling image A. Next, at 212, the flash and non-flash images A and B are used to construct a foreground/background (f/b) map, step 212, which identifies foreground and background regions of the scene captured in the images A, B and C. Processes 208, 210 and 212 are preferably as described in the Ser. No. 11/217,788 application, incorporated by reference above.

At 214, the pixel resolution of blurred low resolution image C is matched to that of the original image A (i.e., as it was before any processing at 208 to 212) by up-sampling image C. Next, using the f/b map constructed at 212, the blurred background from image C is used to replace the background in image A. To speed up this process, blocks of memory from the blurred background image C may be written to the corresponding blocks of image A, rather than replacing on a pixel by pixel basis. Finally, at 218, image processing filters are applied to smooth the transition between the composited foreground and background regions of the composite image resulting from 216.

Variations of the foregoing embodiment are possible. For example, one or both of the images B and C could be pre-view images rather than post-view images. Also, image B and/or image C could be the same resolution as image A. This can serve to avoid matching image resolution at 210 and/or 214.

Figure 3:
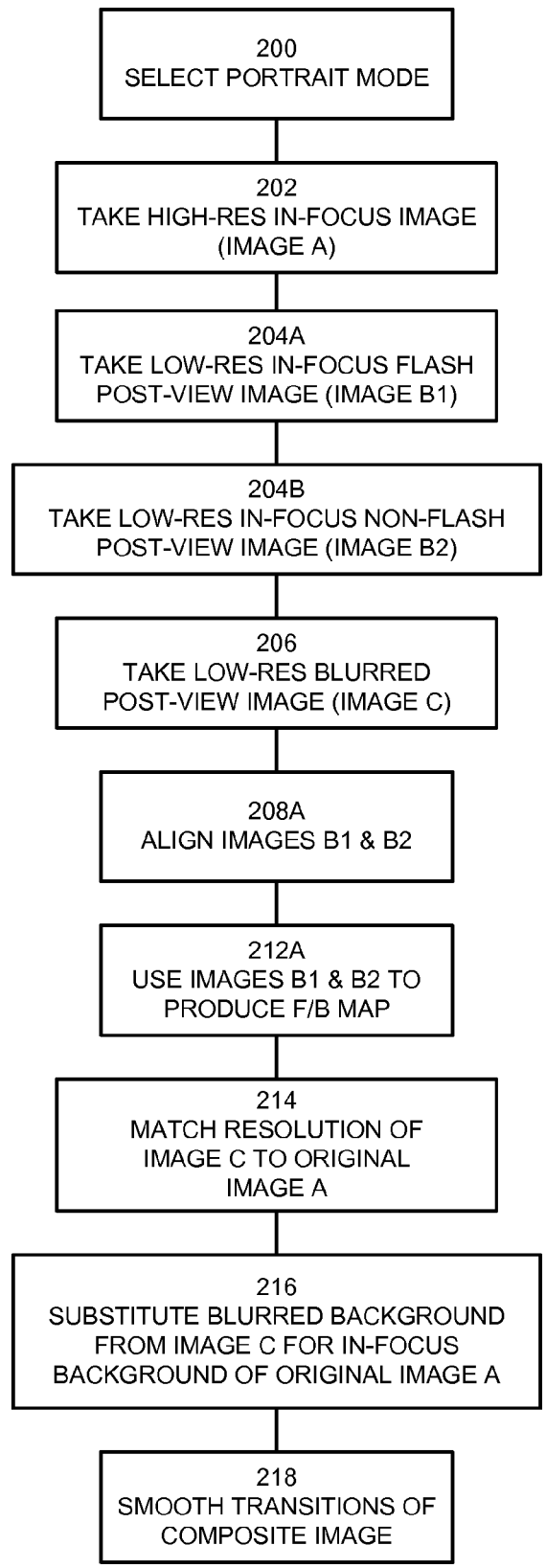
FIG. 3 shows the workflow of the portrait mode processing according to another embodiment.

FIG. 3 illustrates the workflow of a second embodiment of portrait mode processing. Processes which are the same as those in FIG. 2 are given the same reference numerals. Only the differences in the two workflows are described below.

In the embodiment of FIG. 3, upon fully depressing the shutter button the camera takes four images of the same nominal scene in rapid succession. Images A and C (202 and 206) are taken as before, but instead of taking a single image B, two images B1 and B2 are taken, both being low resolution post-view images but one being taken with flash and one without. The two images B1 and B2 are used to construct the f/b map, 208A and 212A according to the principles of the Ser. No. 11/217,788 application, incorporated by reference above, leaving a free choice as to whether the image A is taken with flash or not and avoiding matching image resolution at 210 of FIG. 2.

As before, any one or more of images B1, B2 and C could be a pre-view image, and image C could be the same resolution as image A to avoid matching image resolution at 214.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components.

What is claimed is:

1. A portable digital image acquisition apparatus having no photographic film (hereinafter "portable apparatus"), the portable apparatus comprising a housing that contains an image sensor and a lens for capturing digital images and a flash unit coupled with the housing for providing illumination during image capture, the portable apparatus including a portrait mode for generating in-camera an image of a foreground object against a blurred background, the portable apparatus also including a face detector arranged to detect one or more faces in one or more of a series of digital images being captured and if so to switch to portrait mode, the portrait mode being operable to capture first, second and third images of nominally the same scene, not necessarily in the order stated, at least one of the first and second images being taken with flash, and the third image being blurred compared to the first and second images, the portrait mode further being operable to determine foreground and background regions of the scene using the first and second images, and to substitute the blurred background of the third image for the background of an in focus image of the scene, thereby generating in-camera a digital image of an in-focus foreground object against a blurred background,
wherein the in-focus image comprises one of the first and second images, wherein the first and second images have different pixel resolutions with the in-focus image having the higher resolution, and the apparatus is further configured to determine the foreground and background regions including matching pixel resolutions of the first and second images by at least one of up-sampling the image of lower resolution and sub-sampling the image of higher resolution.

2. A portable apparatus as claimed in claim 1, further being configured to determine the foreground and background regions for aligning two or more of the first, second and third images.

3. A portable apparatus according to claim 1, wherein the third image comprises a pre- or post-view image.

4. A portable apparatus according to claim 1, wherein said digital image acquisition system comprises a digital camera.

5. A portable apparatus according to claim 1, wherein said digital image acquisition system is a combination of a digital camera and an external processing device.

6. A portable apparatus as claimed in claim 5, wherein portrait mode processing to determine foreground and background regions of the scene using the first and second images and to substitute the blurred background of the third image for the background of the in-focus image of the scene is performed in the external processing device.

7. A portable apparatus according to claim 1 wherein during determination of said foreground and background regions, exposure of the foreground region of the first or second image taken without flash is adjusted to be nominally the same as exposure of foreground region of the other of the first or second image taken with flash.

8. A portable apparatus as claimed in claim 1, in which said portrait mode is manually selectable by said user.

9. A portable apparatus as claimed in claim 1 operable to analyze one or more of said first, second and third images to determine the presence of a face, and responsive to detecting a face for selecting said portrait mode.

10. A portable digital image acquisition apparatus having no photographic film (hereinafter "portable apparatus"), the portable apparatus comprising a housing that contains an image sensor and a lens for capturing digital images and a flash unit coupled with the housing for providing illumination during image capture, the portable apparatus having a portrait mode for generating in-camera an image of a foreground object against a blurred background, the portable apparatus also including a face detector arranged to detect one or more faces in one or more of a series of preview images being captured and if so to switch to portrait mode, the portrait mode being operable to capture first, second and third images of nominally the same scene, not necessarily in the order stated, one of the first and second images being taken with flash and the other being taken without flash, and the third image being blurred compared to the first and second images, the portrait mode further being operable to determine foreground and background regions of the scene using the first and second images, and to substitute the blurred background of the third image for the background of an in focus image of the scene, thereby generating in-camera a digital image of an in-focus foreground object against a blurred background, wherein the in-focus image comprises a fourth image captured in the portrait mode, wherein the first and second images are pre- and/or post-view images, and the apparatus is further configured to provide the image of the in-focus foreground object against the blurred background,
wherein the first and second images have different pixel resolution than the fourth image, with the in-focus image having the higher resolution, and the apparatus is further configured to determine the foreground and background regions including matching pixel resolutions of one or more images at the lower resolution of the first and/or second images with the third and/or fourth image by at least one of up-sampling the image of lower resolution and sub-sampling the image of higher resolution.

11. A portable apparatus as claimed in claim 10, further being configured to determine the foreground and background regions for aligning two or more of the first, second and third images.

12. A portable apparatus according to claim 10, wherein the third image comprises a pre- or post-view image.

13. A portable apparatus according to claim 10, wherein said digital image acquisition system comprises a digital camera.

14. A portable apparatus according to claim 10, wherein said digital image acquisition system is a combination of a digital camera and an external processing device.

15. A portable apparatus as claimed in claim 14, wherein portrait mode processing to determine foreground and background regions of the scene using the first and second images and to substitute the blurred background of the third image for the background of the in-focus image of the scene is performed in the external processing device.

16. A portable apparatus according to claim 10, wherein during determination of said foreground and background regions, exposure of the foreground region of the first or second image taken without flash is adjusted to be nominally the same as exposure of foreground region of the other of the first or second image taken with flash.

17. A portable apparatus as claimed in claim 10, in which said portrait mode is manually selectable by said user.

18. A portable apparatus as claimed in claim 10, operable to analyze one or more of said first, second and third images to determine the presence of a face, and responsive to detecting a face for selecting said portrait mode.

19. An in-camera method of generating a digital image of a foreground object against a blurred background within a portable digital image acquisition apparatus having no photographic film (hereinafter "portable apparatus"), the portable apparatus comprising a housing that contains an image sensor and a lens for capturing digital images and a flash unit coupled with the housing for providing illumination during image capture, the portable apparatus including a portrait mode for generating in-camera an image of a foreground object against a blurred background, the portable apparatus also including a face detector arranged to detect one or more faces in one or more of a series of preview images being captured and if so to switch to portrait mode, the method comprising: capturing a series of digital images, detecting one or more faces within the series of digital images, switching to portrait mode as a result of said detecting said one or more faces within said series of digital images, with the apparatus thereby in portrait mode, capturing with said portable apparatus first, second and third images of nominally the same scene, not necessarily in the order stated, at least one of the first and second images being taken with flash, and the third image being blurred compared to the first and second images, determining foreground and background regions of the scene using the first and second images, and substituting the blurred background of the third image for the background of an in focus image of the scene, thereby generating in-camera a digital image of an in-focus foreground object against a blurred background,
wherein the in-focus image comprises one of the first and second images, wherein the first and second images have different pixel resolutions with the in-focus image having the higher resolution, and wherein the system is further configured to determine the foreground and background regions including matching pixel resolutions of the first and second images by at least one of up-sampling the image of lower resolution and sub-sampling the image of higher resolution.

20. The in-camera method as claimed in claim 19, further comprising determining the foreground and background regions and aligning two or more of the first, second and third images.

21. The in-camera method according to claim 20, wherein the third image comprises a pre- or post-view image.

22. The in-camera method according to claim 19, wherein during determination of said foreground and background regions, exposure of the foreground region of the first or second image is adjusted to be nominally the same as exposure of foreground region of the other of the first or second image.

23. The in-camera method as claimed in claim 19, in which said portrait mode is manually selectable by said user.

24. The in-camera method as claimed in claim 19, further comprising analyzing one or more of said first, second and third images to determine the presence of a face, and responsive to detecting a face, selecting said portrait mode.

25. The in-camera method as claimed in claim 19, wherein the in-focus image comprises one of the first and second images.

26. An in-camera method of generating a digital image of a foreground object against a blurred background within a portable digital image acquisition apparatus having no photographic film (hereinafter "portable apparatus"), the portable adulates comprising a housing that contains an image sensor and a lens for capturing digital images and a flash unit coupled with the housing for providing illumination during image capture, the portable apparatus including a portrait mode for generating in-camera an image of a foreground object against a blurred background, the portable apparatus also including a face detector arranged to detect one or more faces in one or more of a series of preview images being captured and if so to switch to portrait mode, the method comprising: capturing a series of digital images, detecting one or more faces within the series of digital images, switching to portrait mode as a result of said detecting said one or more faces within said series of digital images, with the apparatus thereby in portrait mode, capturing with said portable apparatus first, second and third images of nominally the same scene, not necessarily in the order stated, one of the first and second images being taken with flash, and the third image being blurred compared to the first and second images, determining foreground and background regions of the scene using the first and second images, and substituting the blurred background of the third image for the background of an in focus image of the scene, thereby generating in-camera a digital image of an in-focus foreground object against a blurred background, and wherein the in-focus image comprises a fourth image,
wherein the first and second images have lower pixel resolution than the fourth image, wherein the first and second images are pre- and/or post-view images, and wherein the method further comprises matching pixel resolutions of one or more images at the lower resolution of the first and/or second images with the third and/or fourth image by at least one of up-sampling the image of lower resolution and sub-sampling the image of higher resolution.

27. The in-camera method as claimed in claim 26, further comprising determining the foreground and background regions and aligning two or more of the first, second and third images.

28. The in-camera method according to claim 27, wherein the third image comprises a pre- or post-view image.

29. The in-camera method according to claim 26, wherein during determination of said foreground and background regions, exposure of the foreground region of the first or second image is adjusted to be nominally the same as exposure of foreground region of the other of the first or second image.

30. The in-camera method as claimed in claim 26, in which said portrait mode is manually selectable by said user.

31. The in-camera method as claimed in claim 26, further comprising analyzing one or more of said first, second and third images to determine the presence of a face, and responsive to detecting a face, selecting said portrait mode.

32. The in-camera method as claimed in claim 26, wherein the first and second images comprise pre- and/or post-view images.

33. One or more non-transitory processor readable storage devices having processor readable code embodied thereon, said processor readable code for programming one or more processors to perform on in-camera method of generating a digital image of a foreground object against a blurred background within a portable digital image acquisition apparatus having no photographic film (hereinafter "portable apparatus"), the portable apparatus comprising a housing that contains an image sensor and a lens for capturing digital images and a flash unit coupled with the housing for providing illumination during image capture, the portable apparatus including a portrait mode for generating in-camera an image of a foreground object against a blurred background, the portable apparatus also including a face detector arranged to detect one or more faces in one or more of a series of preview images being captured and if so to switch to portrait mode, the method comprising: capturing a series of digital images, detecting one or more faces within the series of digital images, switching to portrait mode as a result of said detecting said one or more faces within said series of digital images, with the apparatus thereby in portrait mode, capturing with said portable apparatus first, second and third images of nominally the same scene, not necessarily in the order stated, one of the first and second images being taken with flash and the other being taken without flash, and the third image being blurred compared to the first and second images, determining foreground and background regions of the scene using the first and second images, and substituting the blurred background of the third image for the background of an in focus image of the scene, thereby generating in-camera a digital image of an in-focus foreground object against a blurred background,
wherein the in-focus image comprises one of the first and second images, wherein the first and second images have different pixel resolutions with the in-focus image having the higher resolution, and wherein the system is further configured to determine the foreground and background regions including matching pixel resolutions of the first and second images by at least one of up-sampling the image of lower resolution and sub-sampling the image of higher resolution.

34. The one or more processor readable storage devices as claimed in claim 33, wherein the method further comprises determining the foreground and background regions and aligning two or more of the first, second and third images.

35. The one or more processor readable storage devices according to claim 34, wherein the third image comprises a pre- or post-view image.

36. The one or more processor readable storage devices according to claim 33, wherein during determination of said foreground and background regions, exposure of the foreground region of the first or second image is adjusted to be nominally the same as exposure of foreground region of the other of the first or second image.

37. The one or more processor readable storage devices as claimed in claim 33, in which said portrait mode is manually selectable by said user.

38. The one or more processor readable storage devices as claimed in claim 33, wherein the method further comprises analyzing one or more of said first, second and third images to determine the presence of a face, and responsive to detecting a face, selecting said portrait mode.

39. The one or more processor readable storage devices as claimed in claim 33, wherein the in-focus image comprises one of the first and second images.

40. One or more non-transitory processor readable storage devices having processor readable code embodied thereon, said processor readable code for programming one or more processors to perform an in-camera method of generating a digital image of a foreground object against a blurred background within a portable digital image acquisition apparatus having no photographic film (hereinafter "portable apparatus"), the portable apparatus comprising a housing that contains an image sensor and a lens for capturing digital images and a flash unit coupled with the housing for providing illumination during image capture, the portable apparatus including a portrait mode for generating in-camera an image of a foreground object against a blurred background, the portable apparatus also including a face detector arranged to detect one or more faces in one or more of a series of preview images being captured and if so to switch to portrait mode, the method comprising: capturing a series of digital images, detecting one or more faces within the series of digital images, switching to portrait mode as a result of said detecting said one or more faces within said series of digital images, with the apparatus thereby in portrait mode, capturing with said portable apparatus first, second and third images of nominally the same scene, not necessarily in the order stated, one of the first and second images being taken with flash and the other being taken without flash, and the third image being blurred compared to the first and second images, determining foreground and background regions of the scene using the first and second images, and substituting the blurred background of the third image for the background of an in focus image of the scene, thereby generating in-camera a digital image of an in-focus foreground object against a blurred background, and wherein the in-focus image comprises a fourth image,
wherein the first and second images have lower pixel resolution than the fourth image, wherein the first and second images are pre- and/or post-view images, and wherein the method further comprises matching pixel resolutions of one or more images at the lower resolution of the first and/or second images with the third and/or fourth image by at least one of up-sampling the image of lower resolution and sub-sampling the image of higher resolution.

41. The one or more processor readable storage devices as claimed in claim 40, wherein the method further comprises determining the foreground and background regions and aligning two or more of the first, second and third images.

42. The one or more processor readable storage devices according to claim 41, wherein the third image comprises a pre- or post-view image.

43. The one or more processor readable storage devices according to claim 40, wherein during determination of said foreground and background regions, exposure of the foreground region of the first or second image is adjusted to be nominally the same as exposure of foreground region of the other of the first or second image.

44. The one or more processor readable storage devices as claimed in claim 40, in which said portrait mode is manually selectable by said user.

45. The one or more processor readable storage devices as claimed in claim 40, wherein the method further comprises analyzing one or more of said first, second and third images to determine the presence of a face, and responsive to detecting a face, selecting said portrait mode.

46. The one or more processor readable storage devices as claimed in claim 40, wherein the first and second images are pre- and/or post-view images.

* * * * *